Feb. 11, 1958 — I. F. HYDEN — 2,822,691
AUTO-MEMORY CLUTCH
Filed Nov. 2, 1953 — 3 Sheets-Sheet 1
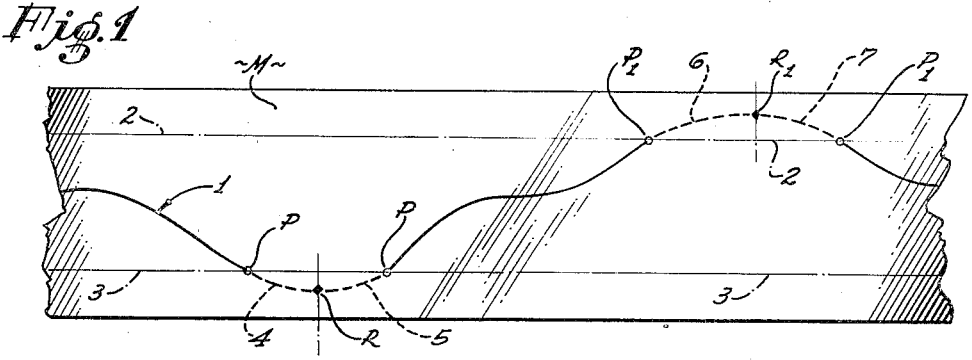
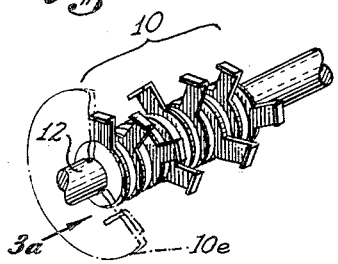
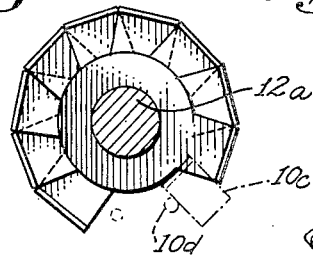
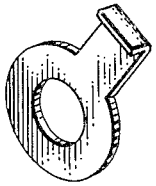
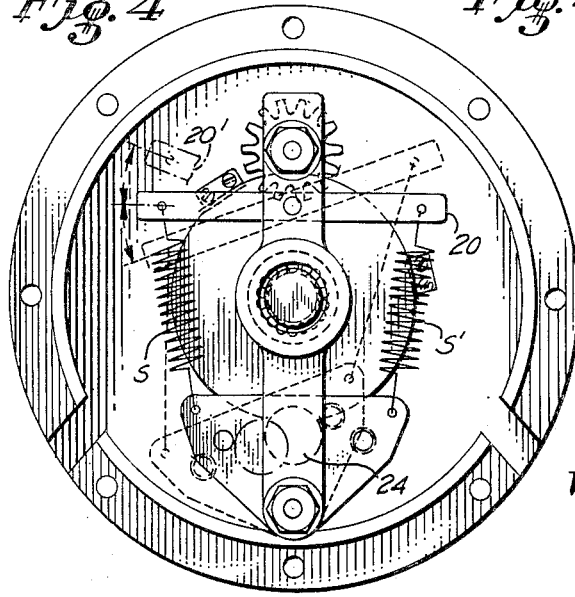
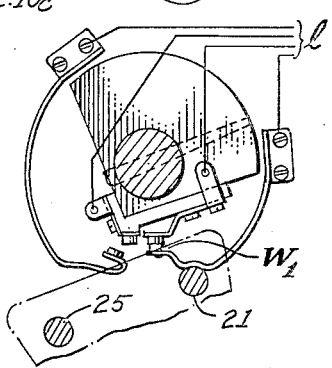
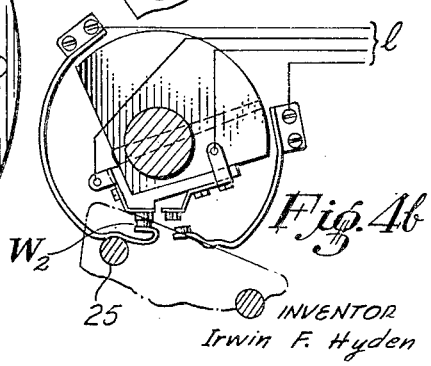
INVENTOR
Irwin F. Hyden
By Hubert E. Metcalf
Their Patent Attorney

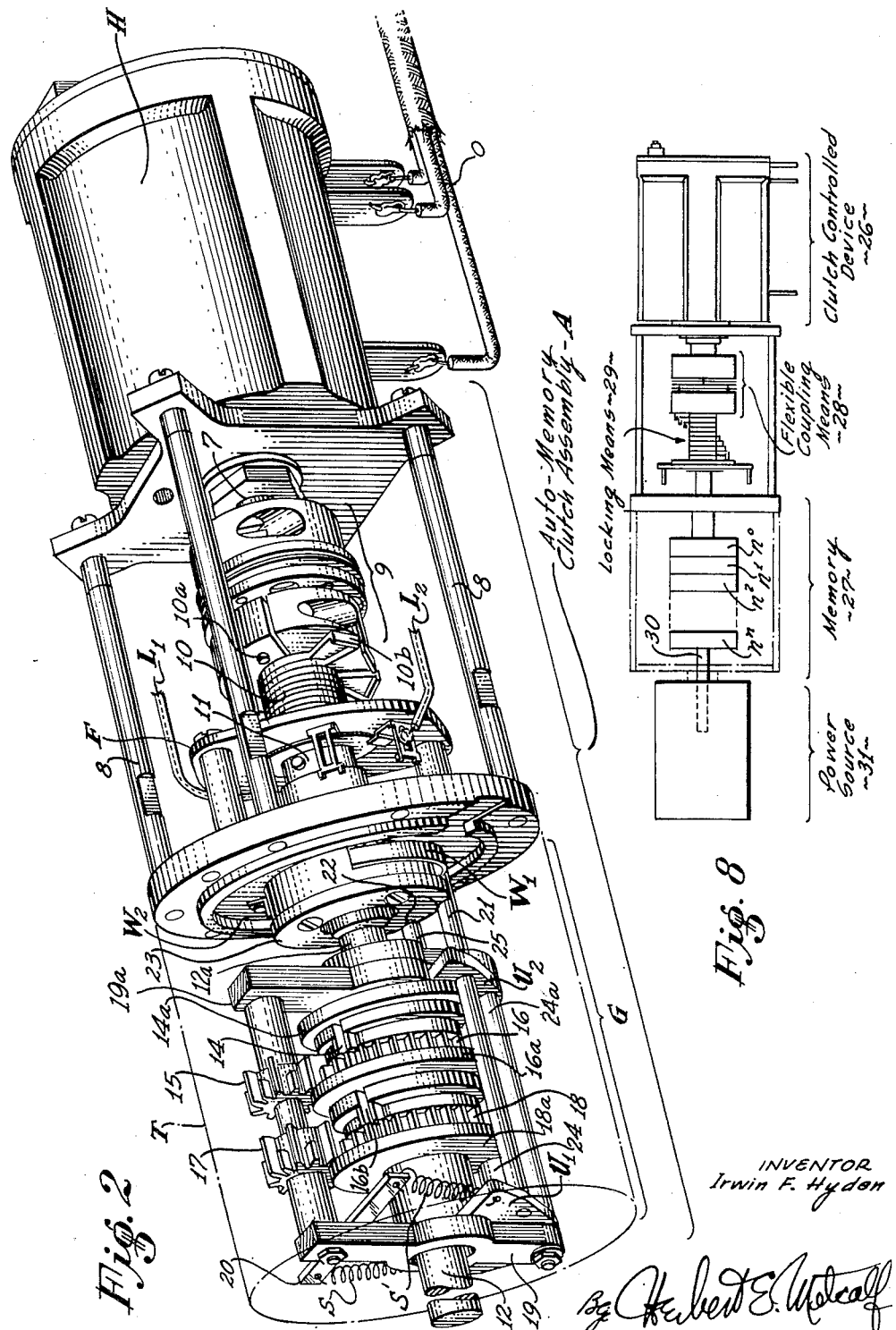

Feb. 11, 1958  I. F. HYDEN  2,822,691
AUTO-MEMORY CLUTCH

Filed Nov. 2, 1953  3 Sheets-Sheet 3

INVENTOR:
Irwin F. Hyden
By Herbert E. Metcalf
Their Patent Attorney

United States Patent Office 2,822,691
Patented Feb. 11, 1958

2,822,691

AUTO-MEMORY CLUTCH

Irwin F. Hyden, Los Angeles, Calif., assignor to Northrop Aircraft, Inc., Hawthorne, Calif., a corporation of California Application November 2, 1953, Serial No. 389,552

2 Claims. (Cl. 74—1)

This invention relates to mechanical memory devices and, more particularly, to a bi-directional auto-memory clutch, capable of locating and accurately identifying the location of a fiducial point on a dynamic device.

A clutching device is often utilized as an essential component of various mechanical movements. By incorporation of a "memory" feature into a clutch, its utility can be drastically extended. A "memory" clutch, for example, can be used in conjunction with rotating components of limited operational range or as an efficient timing device. A useful application of this invention is in the extension of the limited (ten turn) rotational range of a Helipot; it is with this application that the ensuing disclosure is primarily concerned.

It is, accordingly, an object of this invention to provide means for extending the rotational range of a Helipot while retaining a "memory" of the step positions over the operational range.

Briefly, the invention comprises a combination of mechanical components including a mechanical stop which is engaged when the Helipot reaches either extreme of range; further rotation of the shaft upon which the stop is affixed results in stretching a spring which, by lever action, causes a lock dog either to fall into or to be removed from a notch suitably positioned on a fixed cam. This dog, upon locking (or unlocking), effects actuation of a switch located just behind the fixed cam. When the operational range of the Helipot is exceeded, the entire Helipot frame assembly is locked into position and a cam follower effects rotational engagement of a plurality of gear stages, thus permitting a series of idler gears and cams to transmit turns between memory stages.

Although construction details shown in the following drawings will be rather specifically described, it is to be understood at the outset that the present disclosure is to a large extent illustrative and exemplary rather than limiting inasmuch as many different embodiments of this invention are within the scope of skilled workers. For example, orientation of a telescope to a desired sky sector and storing analog information for control actuation are typical variations in use of the invention.

Thus it is a further object of this invention to provide means for locating a fiducial point within the operational range of an adjustable device and also to provide means for accurately determining the extent by which this fiducial point has been exceeded.

It is a still further object of this invention to provide a multiple stage mechanical memory device, conveniently arranged in a stacked array.

Previously enumerated objects and features will be more fully understood and other objects will be rendered apparent by reference to the following detailed description read in conjunction with the accompanying drawings, wherein:

Figure 1 is a fragmentary plan view of a recording strip, serving to illustrate utility of the invention.

Figure 2 is a perspective view of a preferred embodiment of the invention.

Figure 3 is a perspective view of a shaft-lock configuration of an indexed washer assembly.

Figure 3a is a plan view of a shaft-lock configuration of an indexed washer assembly.

Figure 3b is a perspective view of a typical indexed washer.

Figure 4 is a detail view showing a clutch unit and the operative movements thereof.

Figures 4a and 4b are detail views illustrating action of range limit switches.

Figure 8 is a generalized block diagram showing the arrangement of the mechanisms used in the described embodiment of the invention.

Figure 5:
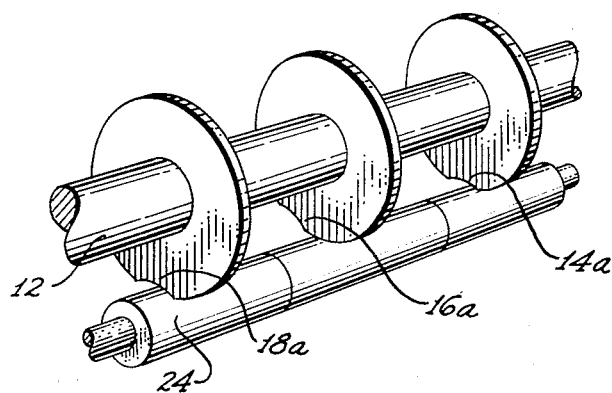
Figures 5, 6 and 7 are perspective views illustrating cam orientation after one, two and twelve revolutions, respectively, of the input shaft.

Although uses of an auto-memory clutch are manifold, the present disclosure is directed toward a specific application—namely, the problem of accurately recording signals from a Helipot, for example, the operational range of which is subject to being exceeded. Figure 1 is illustrative of the utility of such a device; it is a plan view of a recording strip with signals recorded thereon. A recording medium M is shown having an intermittent solid line 1 recorded thereon. As used herein, these lines 1 are representative of output signals from a Helipot, the upper and lower limits of operational range of which are indicated by reference lines 2 and 3, respectively.

When the Helipot exceeds a certain fiducial point P in its lower range 3, the auto-memory clutch records excessive travel in this direction (indicated by dotted line 4) until direction reversal occurs at point R, for example; then the auto-memory clutch duplicates its previous travel but in the opposite direction (along dotted line 5) until fiducial point P is again reached; then recording commences again; thus the auto-memory clutch serves to insure that recording commences at the same point within the lower range of the Helipot as that where recording ceased.

Similarly, when a fiducial point $P_1$ is exceeded in the upper range of Helipot operation, the auto-memory clutch stores revolutions as indicated by dotted travel line 6 until direction reversal point $R_1$ is attained; then these stored revolutions are reproduced (in the opposite direction) as indicated by dotted travel line 7 until fiducial point $P_1$ is properly located; recording then commences again.

It is to be noted that the fundamental principle of this invention lies in the accurate recollection of and location of any desired fiducial point within the operational range of a dynamic device.

In Figure 2 there is presented a perspective view of a preferred embodiment of the invention showing a ten turn Helipot H connected to auto-memory clutch assembly A via Helipot shaft 7 and a fixed connecting frame 8. When the clutch assembly is engaged, the entire assembly A, comprising coupling assembly 9, indexed washer assembly 10, collar 11, shaft 12a, gear assembly G and shaft 12 can be rotated as a single unit. The shaft 12a is pinned to collar 11 on one end, supported by a bearing carried in spacer 23 and is press-fitted into the hub of arm 19a at the other end. The collar 11 is rigidly connected to coupling assembly 9 by a neck (shaft) rotatably carrying the washer assembly 10. However, when either operational limit of Helipot H is exceeded, only two-tooth gear 14, its accompanying cam 14a, a first secondary idler gear 15, a first multi-toothed gear 16, its accompanying cam 16a and accompanying two-toothed gear 16b, a second secondary gear 17, a second multi-toother gear 18, its accompanying cam 18a and shaft 12 rotate, the other units being locked in a stationary position owing to action of indexed washer assembly 10, cams 14a, 16a and 18a, spring S and S', rocker assembly U₁ pivoted on arm 19, rocker assembly U₂ pivoted on arm 19a and bar 20. The shaft 12 mounting gear assembly G is supported near one end by a bearing carried in the hub of arm 19 and the other (right) end of shaft 12 is supported in a bearing pressed into a hole axially bored in the end of shaft 12a. Cam 14a and two-tooth gear 14 are integral with shaft 12 while cams 16a, 18a and gear 16, 16b and 18 are rotatably mounted on bearings on shaft 12.

When either extreme of operational range of Helipot H is approached, indexed washer assembly 10 has acquired a configuration as shown in perspective view along axis of shaft 12a in Figure 3 and attains a final configuration more clearly shown in plan view along axis of shaft 12a in Figure 3a when a limit is reached. A typical stop washer is illustrated, in perspective view, in Figure 3b. A pin 10a embedded in the left half of coupling 9 as shown in Figure 2 engages with first stop washer 10b. Each revolution of coupling 9 rotates stop washer 10b one turn, stop washer 10b picking up a successive stop washer after each revolution until the spiraling fan pattern illustrated in Figure 3a is achieved. This requires ten revolutions in one direction from one extreme. A similar counter-spiraling fan pattern is secured after ten revolutions in the opposite direction. When a full spiral configuration is nearly achieved, after 9½ turns, stop washer 10c is braced against a pin 10d embedded in disk 10e (Figure 3) which, in turn, is secured to the wiper of a two position wafer switch F secured to connecting frame 8. Switch F is switched "on" by action of disk 10e to one position after ten turns in one direction and "on" in the other position after ten turns in the opposite direction. Thus, the last half turn can be used to actuate switch F, from one "on" position to a diametrically opposite "on" position on wafer switch F. Helipot shaft 7 is now locked into position; consequently continued torque in the same direction applied to shaft 12 results in cam 14a overcoming tension of spring S by producing a moment force on a nylon cam follower shaft 24 causing rocker assemblies U₁ and U₂ to rotate on their pivot shaft 24a and thus effecting contact of rod 21 with recess 22 in fixed spacer 23 to lock the frame of gear assembly G, preventing it from revolving. This action is illustrated in Figure 4, the solid lines indicating orientation while clutch is engaged, the dotted lines indicating orientation when clutch is disengaged.

Figure 6:
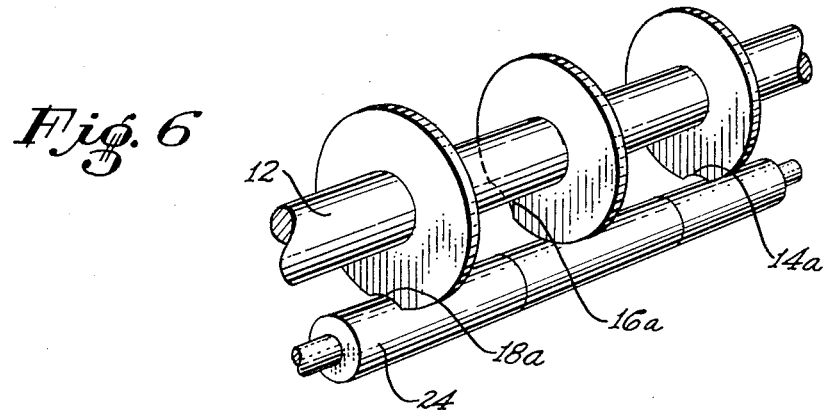
Figure 7:
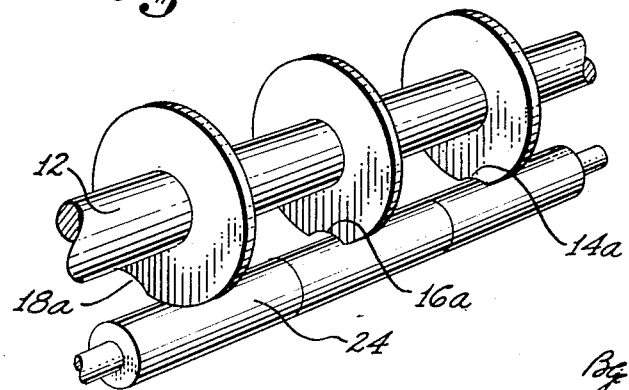

Two-tooth gear 14 is essentially a "one-turn" memory because each revolution of gear 14 advances first secondary gear 15 one notch which, in turn, advances multi-tooth gear 16 by one notch (1/12th of a revolution). Of course, cam 14a is also advanced with two-tooth gear 14; it is the action of cam 14a which prevents spring S from releasing during the first revolution of shaft 12 after clutch disengagement. On the second revolution, multi-toothed gear 16 is advanced one notch and the accompanying motion of its cam 16a maintains tension of spring S through action on shaft 24. After twelve revolutions of shaft 12, multi-toothed gear 18 is advanced one notch (1/12 of a revolution) as is its cam 18a which also serves to maintain tension of spring S. This cam action is illustrated in Figure 5 which is a diagrammatic representation of orientation of cams 14a, 16a and 18a after one revolution of shaft 12 when clutch is disengaged; Figure 6 shows orientation after two revolutions of shaft 12; Figure 7 is same representation after twelve revolutions of shaft 12. It is to be noted that beyond the operational range of Helipot H, multi-toothed gear 16 is advanced 30 degrees for each revolution of shaft 12 and multi-toothed gear 18 (and cam 18a) is advanced 30 degrees for every twelve revolutions of shaft 12; thus gear 16 is essentially a one-turn memory device and gear 18 is essentially a twelve-turn memory device. This action is bi-directional; consequently gear travel in one direction can be accurately reproduced in the opposite direction, thus providing an efficient analog memory device.

Consider now the effect of reversing the direction of rotation of shaft 12, i. e. returning toward the operational range of Helipot H. Since the spur gears 14, 15, 16, 17, 18 are symmetrical, stepping action is accurately reproduced in the opposite direction. It is to be noted that on the final turn of shaft 12 (right before the clutch engages), recesses of cams 14a, 16a and 18a are properly aligned and the cams lock into follower shaft 24 and tension spring S is relieved. Consequently the clutch is engaged at the correct moment, i. e. when Helipot H comes into operational range; the entire unit is now free to rotate as governed by rotation of input shaft 12 since the lock dog (rod 21) is released. Thus action effected at the other extreme of Helipot range is analogous to that previously explained with the exception, of course, that approach and depart rotational directions are reversed. The bar 20 would be tilted in the opposite direction as indicated by 20' (partially shown in Figure 4) and the tension of spring S' is overcome.

Provision is included in the invention for indicating when the ten turn range of Helipot H is exceeded. Switches W₁ and W₂ effect this indication; these switches W₁ and W₂ are energized by clutch disengagement condition because of contact actuation as shown in Figures 4a and 4b by rods 21 and 25, respectively; they provide indication as to when the memory is recording by virtue of their energization status, which can be conveyed to indicating means—a red lamp and a blue lamp, for example, via leads l. Figure 4a is a plan view along axis of shaft 12 which illustrates the action of switch W₁; Figure 4b is a similar view illustrative of the action of switch W₂.

It is to be noted that this same indicating action can be provided by utilization of rotary wafer switch F (Figure 2) having output leads L₁ and L₂; these leads could be utilized for other operations, as relay actuation, for example, if so desired.

Output of Helipot H is conveyed to suitable recording means via output bus O.

Gear assembly G is enclosed in protective cover T.

In order to elucidate further applications of this invention and also to summarize general operational principles thereof, this general discussion is included in the specification. Reference is now made to Figure 8 which is a generalized block diagram of the invention, in which a clutch-controlled device 26 is linked to N-stage memory 27 via coupling means 28 and reference shaft lock means 29. Input shaft 30 is driven by power source 31. It is to be noted that any suitable power source—an electric motor, for example—would suffice to effect rotation of input shaft 30 (this shaft is similar to input shaft 12 shown in Figure 2). In accordance with the setting of reference shaft lock means 29, memory 27 can be engaged at any desired reference point in the rotation of clutch-controlled device 26. Of course, the capacity of mechanical memory 27 is dependent upon the number of gear-cam stages included therein; the gears are arranged to remember rotations in the numerical sequence $n^0$, $n^1$, $n^2$, $n^3$ ... $n^n$. Operation of memory 27 is bi-directional.

Figure 8 serves to illustrate the versatility of this invention, i. e. while there is herein shown and described a preferred embodiment of the invention, it is nevertheless to be understood that minor changes may be made therein without departing from the spirit and scope of the invention as encompassed by the legitimate and valid range of the appended claims.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. An auto-memory clutch comprising: an input shaft adapted to be rotatably driven by input driving means, an N-stage memory means connectable to said input shaft, an output shaft having a mechanically limited rotational range connectable to said input shaft, means for connecting said output shaft to said input shaft within said limited range and connecting said memory means to said input shaft outside said limited range so that said memory means is engaged by said input shaft when said output shaft is disconnected from said input shaft, a wafer switch having a rotary wiper movable between two contact making positions, and means on said output shaft to engage and rotatably move said wiper between said two contact making positions.

2. An auto-memory clutch comprising: an input shaft adapted to be rotatably driven by input driving means, an N-stage memory means connectable to said input shaft, an output shaft having a mechanically limited rotational range connectable to said input shaft, means for connecting said output shaft to said input shaft within said limited range and connecting said memory means to said input shaft outside said limited range so that said memory means is engaged by said input shaft when said output shaft is disconnected from said input shaft, an indexed washer assembly, said assembly connecting said output shaft and a rotatably driven device having a mechanically limited operational range, and stop means cooperating with said assembly so that said operational range of said rotatably driven device is reduced according to the range of said indexed washer assembly is less than the operational range.

References Cited in the file of this patent
UNITED STATES PATENTS

| | | |
|---|---|---|
| 976,918 | Richards | Nov. 29, 1910 |
| 1,627,964 | Galloway | May 10, 1927 |
| 2,107,705 | Lang | Feb. 8, 1938 |
| 2,179,748 | Mastney | Nov. 14, 1939 |
| 2,315,682 | Wiegman et al. | Apr. 6, 1943 |
| 2,441,233 | Beers | May 11, 1948 |